US009524399B1

(12) United States Patent
Takahashi

(10) Patent No.: US 9,524,399 B1
(45) Date of Patent: *Dec. 20, 2016

(54) MULTI-LEVEL INDEPENDENT SECURITY ARCHITECTURE

(71) Applicant: Secturion Systems, Inc., Clearfield, UT (US)

(72) Inventor: Richard J. Takahashi, Layton, UT (US)

(73) Assignee: SECTURION SYSTEMS, INC., Clearfield, UT (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/198,097

(22) Filed: Mar. 5, 2014

Related U.S. Application Data

(60) Provisional application No. 61/807,005, filed on Apr. 1, 2013.

(51) Int. Cl.
*H04L 29/06* (2006.01)
*G06F 21/72* (2013.01)
*G06F 21/78* (2013.01)

(52) U.S. Cl.
CPC .............. *G06F 21/72* (2013.01); *G06F 21/78* (2013.01)

(58) Field of Classification Search
CPC ................................. G06F 21/72; G06F 21/78
USPC .................................................. 713/193, 166
See application file for complete search history.

(56) References Cited

U.S. PATENT DOCUMENTS 5,961,626 A * 10/1999 Harrison ............... G06F 13/387 370/466
6,044,388 A * 3/2000 DeBellis ................. G06F 7/582 380/28
6,081,895 A * 6/2000 Harrison ................ G06F 21/72 380/28
6,101,255 A * 8/2000 Harrison ................ G06F 21/72 380/277
6,304,973 B1 * 10/2001 Williams ............ H04L 63/0272 713/153
6,550,012 B1 * 4/2003 Villa .................... H04L 63/0218 713/168
6,577,734 B1    6/2003 Etzel et al.
6,598,161 B1 * 7/2003 Kluttz ................. G06F 21/6209 713/166
6,845,446 B1 * 1/2005 Fuller .................... G06F 21/72 380/255

(Continued)

OTHER PUBLICATIONS

U.S. Appl. No. 14/208,337, filed Mar. 13, 2014, entitled "Multi-Tenancy Architecture," by Richard J. Takahashi.

(Continued)

*Primary Examiner* — David Garcia Cervetti
(74) *Attorney, Agent, or Firm* — Greenberg Traurig LLP

(57) ABSTRACT

A system includes a plurality of data input ports, each port corresponding to one of a plurality of different levels of security classification; a security device, configured for cryptographic processing, coupled to receive incoming data from each of the plurality of input ports, wherein the incoming data includes first data having a first classification level; a key manager configured to select and tag-identified first set of keys from a plurality of key sets, each of the key sets corresponding to one of the different levels of security classification, wherein the first set of keys is used by the security device to encrypt the first data; and a common encrypted data storage, coupled to receive the encrypted first data from the security device for storage.

18 Claims, 11 Drawing Sheets

(56) References Cited

U.S. PATENT DOCUMENTS

| | | | |
|---|---|---|---|
| 7,200,756 B2* | 4/2007 | Griffin | G06Q 20/105 705/41 |
| 7,607,167 B1* | 10/2009 | Johnson | H04L 45/56 709/201 |
| 7,814,316 B1* | 10/2010 | Hughes | G06F 21/72 713/160 |
| 7,921,288 B1* | 4/2011 | Hildebrand | H04L 63/04 713/165 |
| 8,073,949 B2* | 12/2011 | Cunchon | H04L 63/0464 709/225 |
| 8,166,289 B2* | 4/2012 | Owens | G06F 21/575 713/153 |
| 8,234,686 B2* | 7/2012 | Alvermann | G06F 21/72 380/270 |
| 8,289,975 B2* | 10/2012 | Suganthi | H04L 29/12339 370/395.53 |
| 8,418,252 B2* | 4/2013 | Akyol | H04L 63/0428 380/2 |
| 8,433,783 B2* | 4/2013 | Jackowski | H04L 47/19 370/469 |
| 8,433,929 B2* | 4/2013 | Yamashita | G06F 21/31 713/156 |
| 8,438,626 B2* | 5/2013 | Anderson | G06F 9/54 726/11 |
| 8,443,069 B2* | 5/2013 | Bagepalli | H04L 63/166 709/203 |
| 8,479,304 B1* | 7/2013 | Clifford | H04L 63/0428 707/692 |
| 2002/0091975 A1* | 7/2002 | Redlich | G06F 21/6218 714/699 |
| 2002/0099959 A1* | 7/2002 | Redlich | G06F 21/554 726/23 |
| 2003/0012373 A1* | 1/2003 | Ogura | G03F 7/70508 380/30 |
| 2003/0014627 A1 | 1/2003 | Krishna et al. | |
| 2003/0051054 A1* | 3/2003 | Redlich | G06F 21/6209 709/246 |
| 2003/0070077 A1* | 4/2003 | Redlich | H04L 9/085 713/182 |
| 2003/0119484 A1* | 6/2003 | Adachi | H04L 63/04 455/411 |
| 2003/0120949 A1* | 6/2003 | Redlich | C07K 14/70575 726/21 |
| 2003/0172279 A1* | 9/2003 | Yudasaka | G06K 19/07 713/176 |
| 2003/0182435 A1* | 9/2003 | Redlich | C07K 14/70575 709/229 |
| 2003/0196108 A1* | 10/2003 | Kung | H04L 63/0823 726/6 |
| 2003/0210702 A1* | 11/2003 | Kendall | H04L 45/00 370/401 |
| 2004/0054914 A1* | 3/2004 | Sullivan | G06F 21/602 713/189 |
| 2005/0097357 A1* | 5/2005 | Smith | H04L 63/083 726/4 |
| 2005/0132070 A1* | 6/2005 | Redlich | G06F 21/6209 709/228 |
| 2005/0138109 A1* | 6/2005 | Redlich | G06F 17/30699 709/201 |
| 2005/0138110 A1* | 6/2005 | Redlich | C07K 14/70575 709/201 |
| 2005/0190758 A1* | 9/2005 | Gai | H04L 12/4645 370/389 |
| 2005/0198412 A1* | 9/2005 | Pedersen | H04L 63/0428 710/30 |
| 2006/0059537 A1* | 3/2006 | Alvermann | G06F 21/72 726/1 |
| 2006/0149965 A1 | 7/2006 | Sharma | |
| 2006/0174102 A1* | 8/2006 | Smith | H04L 12/2803 713/150 |
| 2006/0174112 A1* | 8/2006 | Wray | H04L 63/0428 713/168 |
| 2007/0067634 A1* | 3/2007 | Siegler | G06F 21/31 713/171 |
| 2007/0115812 A1* | 5/2007 | Hughes | H04L 1/1642 370/229 |
| 2007/0192596 A1* | 8/2007 | Otsuka | H04L 63/20 713/166 |
| 2007/0195951 A1 | 8/2007 | Leung, Jr. | |
| 2007/0204159 A1* | 8/2007 | Hara | H04L 63/0428 713/171 |
| 2007/0250921 A1* | 10/2007 | LiVecchi | H04L 63/105 726/7 |
| 2008/0052533 A1* | 2/2008 | Iida | H04L 12/4641 713/189 |
| 2008/0062803 A1* | 3/2008 | Fronte | G06F 21/72 365/230.03 |
| 2008/0151893 A1* | 6/2008 | Nordmark | H04L 45/00 370/392 |
| 2008/0168135 A1* | 7/2008 | Redlich | G06Q 10/10 709/204 |
| 2009/0178144 A1* | 7/2009 | Redlich | G06F 21/6209 726/27 |
| 2009/0254572 A1* | 10/2009 | Redlich | G06Q 10/06 |
| 2009/0327617 A1* | 12/2009 | Furuichi | G06F 21/6218 711/147 |
| 2010/0010968 A1* | 1/2010 | Redlich | G06F 17/30672 707/E17.014 |
| 2010/0115260 A1* | 5/2010 | Venkatesan | G06F 21/14 713/150 |
| 2010/0198730 A1 | 8/2010 | Ahmed et al. | |
| 2010/0250497 A1* | 9/2010 | Redlich | F41H 13/00 707/661 |
| 2010/0278338 A1* | 11/2010 | Chang | G09C 1/00 380/200 |
| 2012/0066509 A1* | 3/2012 | Lapp | G06F 21/606 713/189 |
| 2012/0110316 A1 | 5/2012 | Chamberlain et al. | |
| 2012/0159183 A1* | 6/2012 | Adams | G06F 21/577 713/189 |
| 2012/0213360 A1* | 8/2012 | Le Quere | G06F 9/3877 380/28 |
| 2012/0324222 A1* | 12/2012 | Massey | H04L 63/105 713/166 |
| 2013/0077788 A1* | 3/2013 | Blanchard | H04B 7/18593 380/255 |
| 2014/0013123 A1* | 1/2014 | Khazan | G06F 21/602 713/189 |
| 2014/0108782 A1 | 4/2014 | Salinger et al. | |
| 2014/0122866 A1 | 5/2014 | Haeger et al. | |
| 2014/0324698 A1* | 10/2014 | Dolcino | G06Q 20/3227 705/44 |

OTHER PUBLICATIONS

U.S. Appl. No. 14/217,912, filed Mar. 18, 2014, entitled "Removable or Replaceable Physical Interface Input/Output Module," by Richard J. Takahashi.

U.S. Appl. No. 14/219,651, filed Mar. 19, 2014, entitled "Secure End-To-End Communication System," by Richard J. Takahashi.

Carbonite White Paper—"The Better Backup Plan, Making Sense of the Cloud".

Carbonite White Paper—"The Better Backup Plan, Trouble Free Backup Solutions".

U.S. Appl. No. 14/177,392, filed Feb. 11, 2014, entitled "Security Device With Programmable Systolic-Matrix Cryptographic Module and Programmable Input/Output Interface," by Richard J. Takahashi.

* cited by examiner

MULTI-LEVEL INDEPENDENT SECURITY ARCHITECTURE

RELATED APPLICATIONS

This application claims priority to U.S. Provisional Application Ser. No. 61/807,005, filed Apr. 1, 2013, entitled "MULTI-LEVEL INDEPENDENT SECURITY ARCHITECTURE," by Richard J. Takahashi, the entire contents of which application is incorporated by reference as if fully set forth herein.

This application is related to U.S. Non-Provisional application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, the entire contents of which application is incorporated by reference as if fully set forth herein.

FIELD OF THE TECHNOLOGY

At least some embodiments disclosed herein relate to security processing in general, and more particularly, but not limited to, security processing (e.g., encryption and/or decryption) of data using keys selected for different levels of security classification.

BACKGROUND

Existing military-intelligence systems require physically isolated, protected data storage sites for each level of classified data. This requires separated storage systems for each level of classified data. This is a costly method to store data and access data. In addition, sharing cross-domain information (e.g., sharing data between classified systems) is slow and cumbersome in a world where minutes can make a significant difference in the results achieved.

SUMMARY OF THE DESCRIPTION

Systems and methods to provide security processing of data (e.g., packets) having different levels of security classification using a security device are described herein. Some embodiments are summarized in this section.

In one embodiment, a system includes: a plurality of data input ports, each port corresponding to one of a plurality of different levels of security classification; a security device, configured for cryptographic processing, coupled to receive incoming data from each of the plurality of input ports, wherein the incoming data includes first data having a first classification level; a key manager configured to select a first set of keys from a plurality of key sets, each of the key sets corresponding to one of the different levels of security classification, wherein the first set of keys is used by the security device to encrypt the first data; and a common encrypted data storage, coupled to receive the encrypted first data from the security device for storage.

In one embodiment, a method includes: receiving incoming data from a plurality of data ports, each port corresponding to one of a plurality of different levels of security classification, wherein the incoming data includes first data having a first classification level; encrypting the first data using a first set of keys, the first set of keys selected from a plurality of key sets, each of the key sets corresponding to one of the different levels of security classification; and writing the encrypted first data into a common encrypted data storage.

In one embodiment, a security device includes: a plurality of data ports, each port corresponding to one of a plurality of different levels of security classification; a plurality of cryptographic modules, each cryptographic module dedicated to perform encryption and decryption for one of the different levels of security classification, each cryptographic module coupled to receive incoming data from one of the plurality of data ports, and the incoming data including first data having a first classification level; at least one key cache storing a plurality of key sets, each of the key sets corresponding to one of the different levels of security classification, wherein a first set of keys is selected from the plurality of key sets to encrypt the first data by a first cryptographic module of the cryptographic modules; and a packet write engine, included in the first cryptographic module, configured to send the encrypted first data to a common data storage.

The disclosure includes methods and apparatuses which relate to and/or perform the above. Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
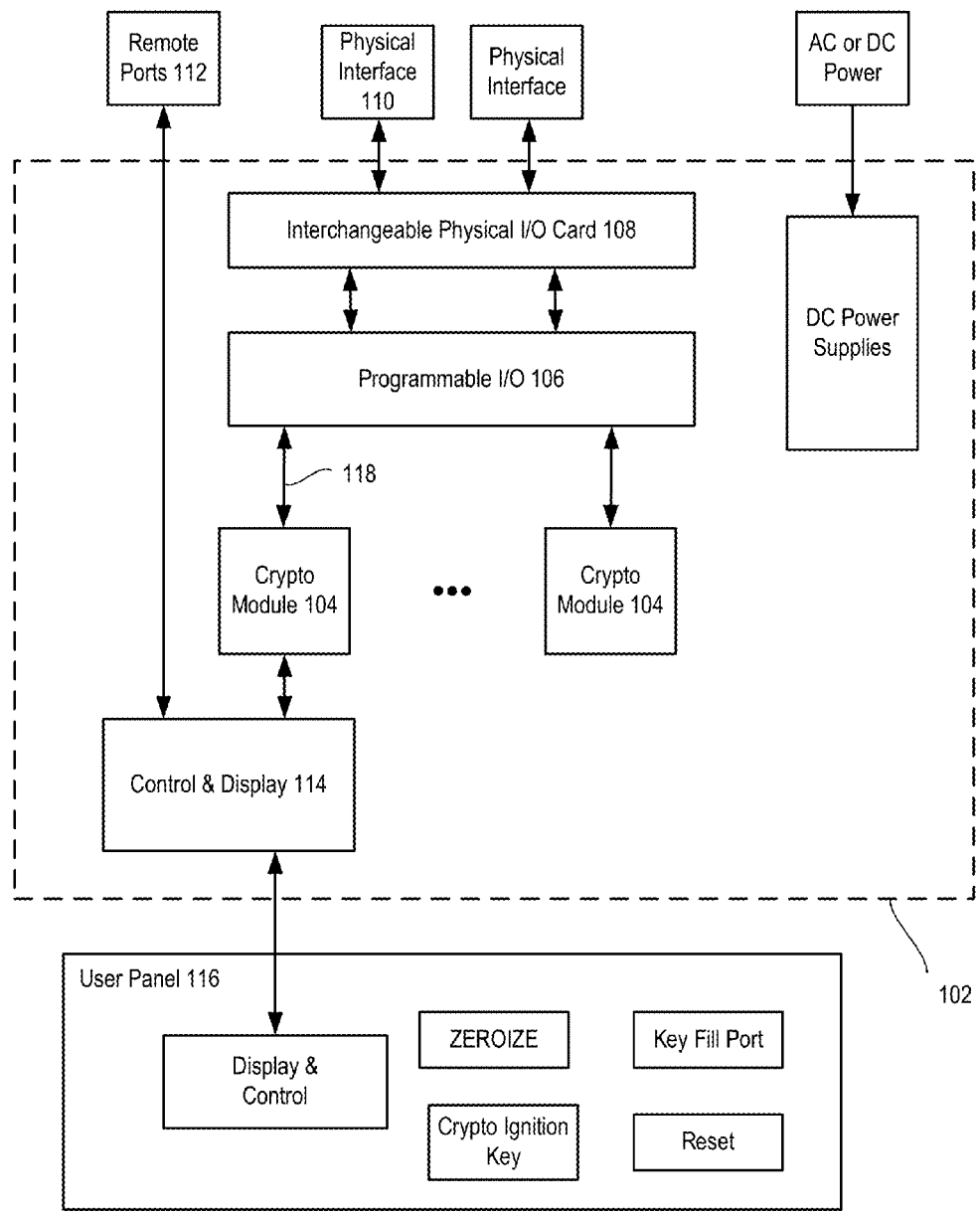
FIG. 1 shows a security processing system including a security device with a plurality of programmable cryptographic modules and a programmable input/output interface, according to one embodiment.

FIG. 1 shows a security processing system including a security device 102 with a plurality of programmable cryptographic modules 104 and a programmable input/output interface 106, according to one embodiment. An interchangeable physical interface 108 is configured to receive a plurality of incoming packets from a data source (e.g., through physical interface 110). In one embodiment, the plurality of cryptographic modules is configured using at least two systolic layers for processing of packets, control data, and keys as discussed further below.

Programmable input/output interface 106 is coupled to the interchangeable physical interface and is configured to route each of the plurality of incoming packets to one of the cryptographic modules 104 for encryption to provide a plurality of encrypted packets. The programmable input/output interface 106 is configured to route the encrypted packets to a common internal or external data storage.

For outgoing packets, programmable input/output interface 106 routes encrypted packets to one of the cryptographic modules 104 for decryption. The decrypted packets are then routed by programmable input/output interface 106 to the data source.

In one embodiment, programmable input/output interface 106 is programmable to support different interface protocols, and each of the plurality of cryptographic modules 104 is programmable to support different encryption protocols (e.g., each module 104 may be programmed to support a different protocol). Programmable input/output interface 106 may include one or more field-programmable gate arrays that are programmable to support the different interface protocols. In one embodiment, programmable input/output interface 106 may be coupled to the cryptographic modules 104 by a high-speed bus such as, for example, a PCI-e bus.

In one embodiment, the interchangeable physical interface 108 is configurable to support two different physical interfaces. In one example, the interchangeable physical interface 108 comprises a replaceable physical input/output panel (or card) that can be replaced independently of the programmable input/output interface 106 and the plurality of cryptographic modules 104.

FIG. 1 also illustrates a control and display unit 114 coupled to control operation of cryptographic modules 104, and also to send or receive data over remote ports 112. Remote ports 112 may be, for example, RS-232, USB, or GigEthernet ports. Remote ports 112 may implement communications using, for example, an SNMP protocol.

Control and display unit 114 provides drivers to a display and status control screen on the user panel 116. User panel 116 also provides soft or hard buttons for user control and data input during the operation of security device 102. Various functions controllable on user panel 116 include a zeroize control (to zeroize the keys), a crypto ignition key (to start the encryption process), a key fill port (to load the keys), and a system reset.

In one embodiment, security device 102 (which may be, e.g., implemented as a security appliance) is used to prevent data breaches by a hacker trying to gain access to encrypted data. In this embodiment, security device 102 provides security, encryption, high-assurance, high-availability sustained bandwidths up to 400 Gbs (full duplex), programmability for data-at-rest and in-network applications. The security device 102 has an interchangeable I/O flexible module as described above to support different physical (PHY) interface connectors and electronics.

In one embodiment, use of the interchangeable I/O interface 108 and programmable I/O interface 106 (implemented using an FPGA I/O systolic array) provides the following advantages:

1) The FPGA I/O systolic array can be programmed for different interfaces and the interchangeable I/O is designed with the selected interface's physical electronics and connectors. This permits the main physical chassis of security device 102 to remain unchanged and to readily use different interface options that can be changed by a user.

2) The security device architecture in conjunction with the interchangeable I/O provides a high-density connectors capability. These flexible I/O design features can be programmed for many different types of interfaces to maximize interfacing flexibility to an end network application.

3) Scalable performance in programmable specified data rate increments for each cryptographic module up to, e.g., six modules which will have up to six times the programmed full duplex data rates. Other lesser or greater numbers of cryptographic modules may be used in other designs.

In one embodiment, flexible I/Os and flexible cryptographic (sometimes simply referred to as "crypto" herein) modules are accomplished by using a scalable systolic architecture and crypto-modules and interchangeable input/output (I/O) card, as described herein. The security device 102 has programmable delay latencies for a specified data block size of programmable bytes sizes. The security device architecture has two programmable elements: the programmable crypto-module and the programmable flexible I/O.

In one embodiment, the flexible I/O has two components: The FPGAs can be programmed to support different interface protocols, and an interchangeable physical I/O card is used to support the physical interfaces and connectors. The flexible I/O also has a switching network. The scalable and programmable crypto-module has a programmable full duplex bandwidth consisting of high performance CPUs and FPGAs clocking up to maximum allowable clock rates internal to the FPGA. This CPU and FPGA in systolic-matrix configuration and implementation provides a fully-programmable system to meet many different applications.

In one embodiment, the security device crypto-module design will be using high performance CPU or equivalent processors and FPGAs forming a programmable systolic scalable module. The programmability efficiencies of design are realized by segmenting functional subsystems from packet engines, crypto engines, key handler and overheadcontrol management engines. The I/O interface incorporates functional blocks (e.g., 100 Gbs Ethernet, PCI-express, Fibre channel, SAS, Infiniband, SCSI, or any other high speed interface protocols) that are incorporated.

In one embodiment, the security device 102 can be both a media-level encryptor and a file system encryptor. All data payload passing thru security device 102 is encrypted except for the file system headers-commands (which remain in the clear). Therefore, the existing file system will be intact with no drivers required for the end system. The only interface required is for the end system remote management and key management products. This makes the security device transparent to a user or network storage system.

Figure 2:
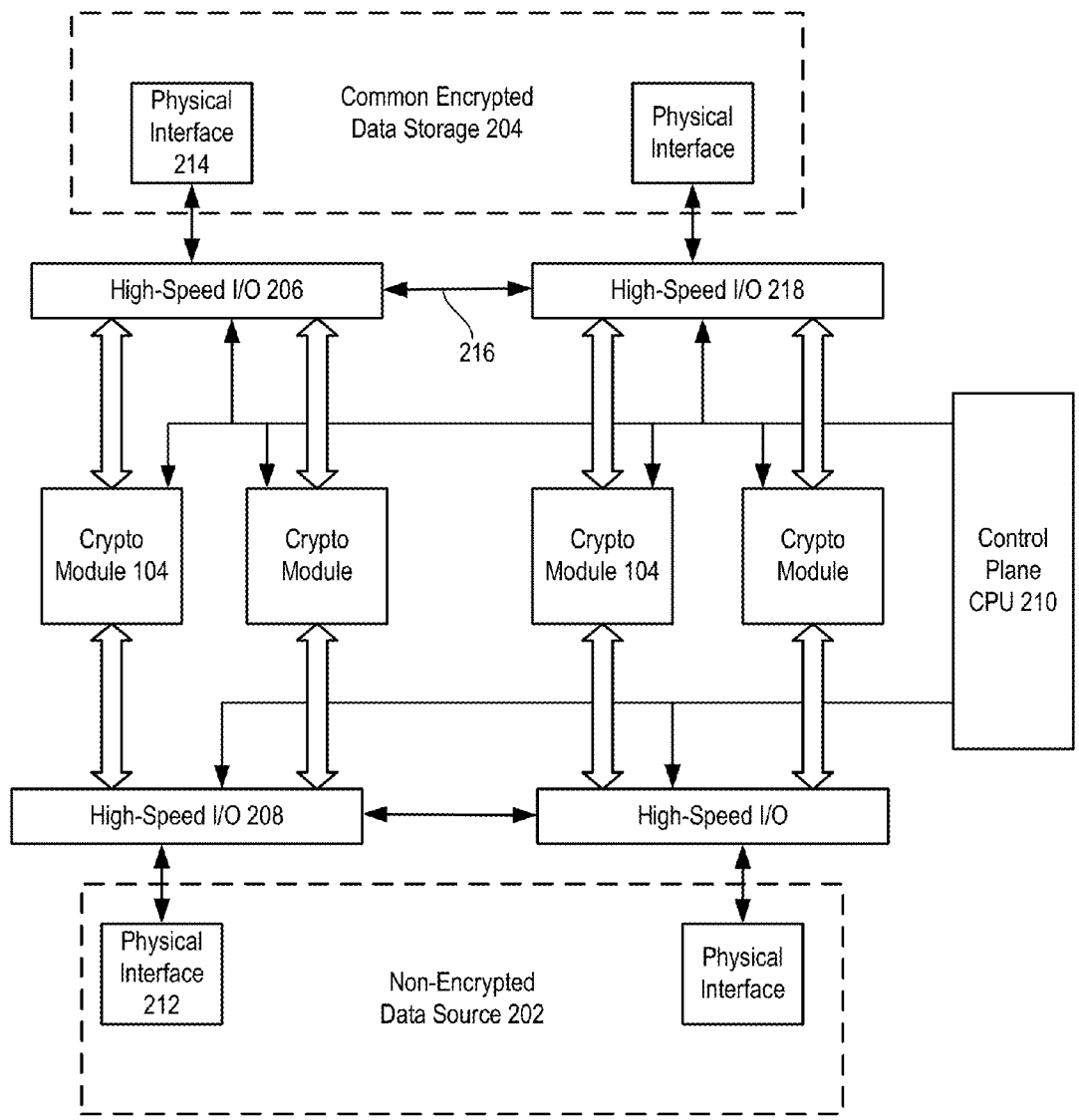
FIG. 2 shows a systolic-matrix security processing system for receiving and encrypting data packets from a non-encrypted data source, and concurrently processing control and data from a control plane for storage in a common encrypted data storage, according to one embodiment.

FIG. 2 shows a security processing system for receiving and encrypting data packets from a non-encrypted data source 202 for storage in a common encrypted data storage 204, according to one embodiment. The system includes cryptographic modules 104. Each cryptographic module is coupled between programmable high-speed input/output (I/O) interfaces 206 and 208, which are each coupled to an interchangeable physical interface (see, e.g., interface 108 in FIG. 1). In one embodiment, interfaces 206 and 218 communicate with each other during security data processing using, for example, a serial bus 216 (e.g., an Interbus serial bus).

Processor 210 handles control plane and data processing for the cryptographic modules 104 and the high-speed input/output interfaces 206, 208, 218. In one embodiment, processor 210 is a control plane processor configured to control systolic data flow for the cryptographic modules 104, and also to control loading of keys from an external key manager to an internal key cache (see, e.g., FIG. 9 below).

Physical interface 212 receives a plurality of incoming packets from data source 202. The first programmable high-speed input/output interface 208 routes each of the plurality of incoming packets to one of the cryptographic modules 104 for encryption processing to provide encrypted packets. The second programmable high-speed programmable input/output interface 206 routes the encrypted packets from the cryptographic module 104 to common encrypted data storage 204 via physical interface 214.

In one embodiment, the routing and switching functions of high-speed interfaces 206 and 208 are provided by programmable input/output interface 106 of FIG. 1. In one embodiment interchangeable physical input/output interface 108 includes physical interface 212 and/or 214.

In one embodiment, each of the encrypted packets has a respective tag to identify an original entry port (e.g., a port of high-speed I/O interface 208), keys or key addresses associated with each of the encrypted packets is decrypted by one of the cryptographic modules to provide corresponding decrypted packets, and the first programmable input/output interface 208 is further configured to use the respective tag to route each decrypted packet back to its original entry port.

In one embodiment, each programmable input/output interface 206, 208, 218 is programmable to support different interface protocols. For example, the first programmable input/output interface 208 may include a plurality of field-programmable gate arrays that are programmable to support the different interface protocols.

In one embodiment, the first programmable input/output interface 208 and the second programmable input/output interface 206 each comprise a switching network and a router (not shown) to route incoming packets (from data source 202 or data storage 204, respectively) to one of the cryptographic modules 104.

In one embodiment, each cryptographic module 104 is designed and programmed, and mathematically optimized for any cryptographic algorithms and network IP protocols. The design can be scaled up to, for example, six or more crypto modules. The security device 102 can be mathematically optimized, for example, for any cryptographic algorithms for full-duplex data rate performance.

In one embodiment, the security device architecture is adaptable to any enterprise class data-at-rest or IP network solution due to the flexible switching I/O architecture. The flexible input and output switching I/O interfaces provide a significant cost advantage and homogeneous data flow and relax the need for data separation. The security device may use FPGAs that bridge to the native I/O interface for the required number of crypto-modules. This allows a single crypto-module to be used with many possible system implementations and configurations based on the end application I/O type and throughput requirements and also be scalable with programmable data rate increments.

In one embodiment, the flexible switch I/O architecture described herein includes programmable I/O modules (using FPGAs) that function as a low latency bridge and switch between the native I/O to the target data-at-rest system and to the internal array of crypto-module processors. A pair of separated, designated programmable FPGA-based I/O interface modules bridges security device 102 to an industry standard network. This scalability and flexibility enables security device 102 to be inserted into existing or new storage network systems supporting scalable data rates.

In one embodiment, the flexible programmable I/O interface is adaptable to any enterprise, or mobile, class data-at-rest interface application. The flexible I/O architecture includes programmable I/O modules (using FPGAs) that function as a low latency bridge between the native I/O of the target data-at-rest system and the internal array of crypto-modules. Flexible I/O programmability is based on FPGA-based modules that can be programmed to any industry standards or a custom interface to the storage system fabric or IP network.

In one embodiment, security device 102 performs at data rates only limited by the technology used. The key-handling agility is matched to the data rates. The internal key management is central to the performance of the cryptographic module in this embodiment.

Figure 3:
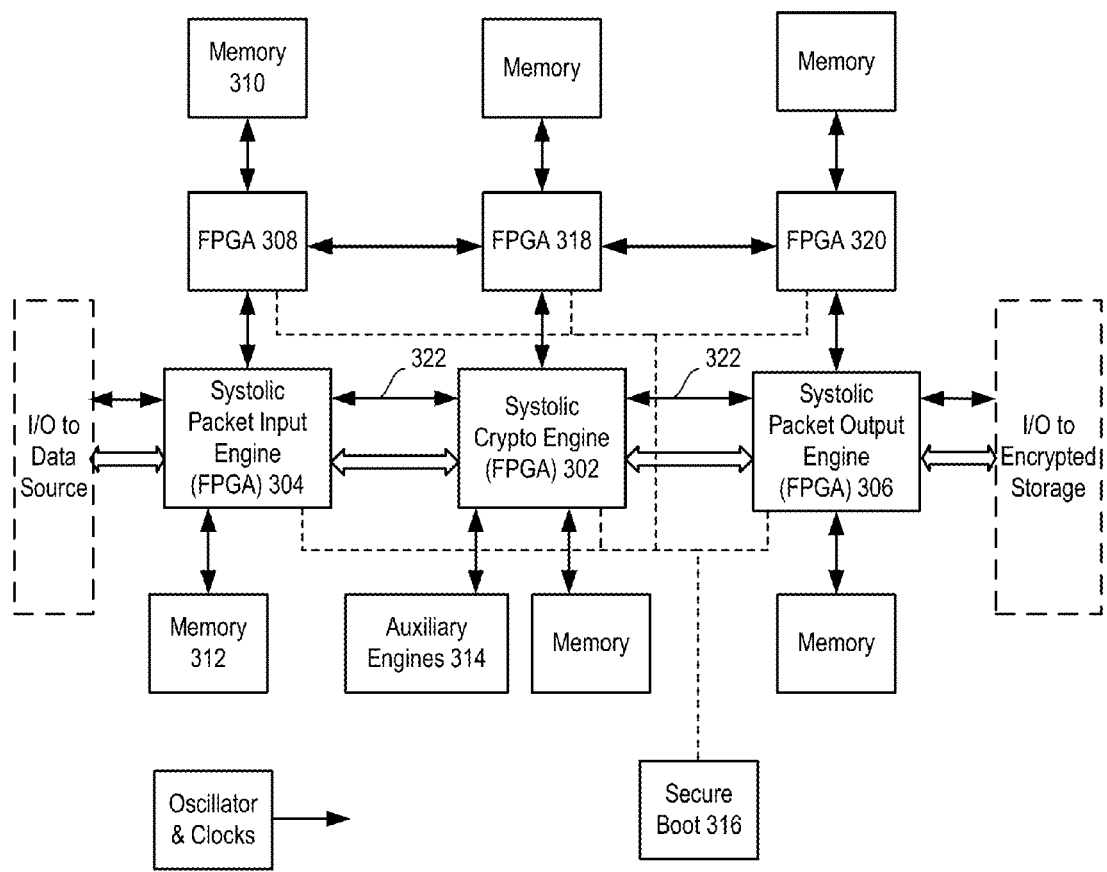
FIG. 3 shows a systolic-matrix cryptographic module including programmable input and output packet engines and a programmable cryptographic processing engine, according to one embodiment.

FIG. 3 shows a cryptographic module 104 including programmable input and output packet engines and a programmable cryptographic processing engine, according to one embodiment. More specifically, cryptographic module 104 comprises a programmable packet input engine 304, a programmable cryptographic engine 302, and a programmable packet output engine 306. In one embodiment, packet engines 304 and 306 are coupled to cryptographic engine 302 using a high-speed serial or parallel bus 322 (e.g., an Interbus bus) for control operations, and using high-speed data busses for data transfer.

In one embodiment, the programmable packet input engine 304, the programmable cryptographic engine 302, and the programmable packet output engine 306 are each configured as a systolic-matrix array and each include one or more field-programmable gate arrays (FPGAs) programmable to support different security protocols. In one example, the programmable packet input engine 304, the programmable cryptographic engine 302, and the programmable packet output engine 306 are each coupled to a respective dedicated program memory for each FPGA (e.g., memory 310 or 312), and to a respective dedicated processor (not shown) to control programming of each FPGA. Each memory 310, 312 may be used, e.g., to provide data, keys buffering and/or storage.

In a method according to one embodiment, the first programmable input/output interface 208 (see FIG. 2) includes a field-programmable gate array (FPGA), and the method includes programming the FPGA to support a different interface protocol than previously used for receiving incoming data packets. In this method, each of the plurality of cryptographic modules 104 includes programmable systolic packet input engine 304, programmable systolic-matrix cryptographic engine 302, and programmable systolic-matrix packet output engine 306. The method further includes programming an FPGA of the packet input engine 304, an FPGA of the cryptographic engine 302, and an FPGA of the packet output engine 306.

In one embodiment, a top systolic layer includes FPGAs 308, 318, and 320, which are coupled to systolic packet engines 304, 306 and cryptographic engine 302, each also including an FPGA, in order to form a two-dimensional systolic-matrix array for data and control processing.

In one embodiment, each crypto module 104 has input and output packet engines and the crypto core. The crypto module has a systolic crypto engine that is tightly coupled to the input and output systolic packet engines. Each element in the crypto module has a dedicated high-performance CPU plus its memory, and dedicated memory to the input-output systolic packet engines and crypto core buffer/storage memory.

In one embodiment, each FPGA(s) array has a dedicated program memory. Also, a compression engine (included, e.g., in auxiliary engines 314) is included for data compression or other data processing required.

In one embodiment, the crypto module of FIG. 3 uses secure boot 316 to verify the FPGA code and that any software (SW) within the crypto module is encrypted-secure and authenticated. During the secure boot process, if any anomalies are detected, the system will not boot and further may provide a user alert that issues have been detected. The secure boot 316 may be designed to work with existing industry key manager systems.

In one embodiment, the crypto module design of FIG. 3 provides features such as hard-wired, one-time programmable options and custom analog/digital circuits for flexible physical partitioning for un-encrypted (plain text) and encrypted (cipher text) separation.

Figure 4:
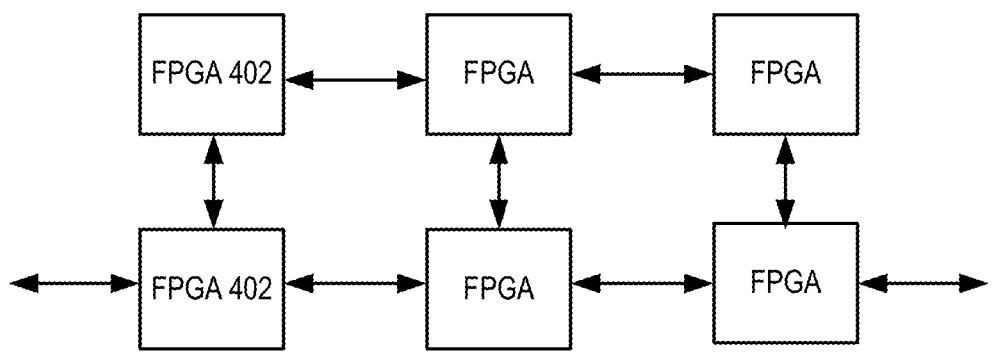
FIGS. 4 and 5 each show an example of a systolic-matrix array with two-dimensional computing paths, according to various embodiments.
Figure 5:
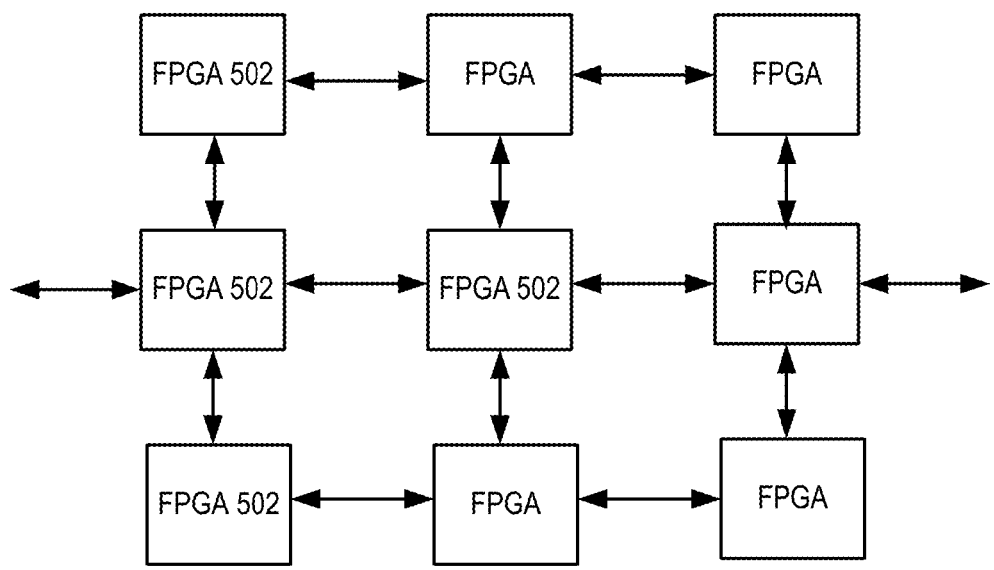

FIGS. 4 and 5 each show an example of a systolic-matrix array with two-dimensional computing paths, according to various embodiments. FIG. 4 shows FPGAs 402 organized in a systolic-matrix array for data, keys and control processing of security packets. Although FPGAs are shown forming the systolic-matrix array in FIG. 4, other forms of programmable devices, or other types of data processing units or processors may be used to form the systolic-matrix array in other embodiments (e.g., ASICs may be used). FIG. 5 shows an alternative configuration for systolic-matrix array comprising FPGAs 502 for data control processing of security packets.

In one embodiment, each cryptographic module 104 is implemented using a systolic-matrix array configuration. For example, cryptographic module 104 as illustrated in FIG. 3 is configured in a systolic-matrix array such as the basic form illustrated in FIG. 4. In addition, in one embodiment, the input and output packet engines 304, 306 and/or the cryptographic processing engine 302 for each cryptographic module 104 are also each themselves designed with an internal systolic-matrix array architecture. For example, the cryptographic processing engine 302 may be configured in a systolic-matrix array configuration such as illustrated in FIG. 5. In another example, each packet engine may itself have the systolic array configuration of FIG. 4 or FIG. 5, or yet other systolic array configurations, as part of its internal sub-block processing architecture.

Thus, as described above, in some embodiments, security device 102 is configured with a two or greater multiple-layer systolic-matrix array architecture. In this architecture, each cryptographic module 104 has a systolic-matrix array configuration (i.e., a top systolic array layer), and each of the packet engines and/or cryptographic processing engine has an internal systolic-matrix array configuration (e.g., in a lower systolic array layer formed of FPGAs that is logically underneath the top systolic-matrix array layer). The multiple-layers above combined with two-dimensional systolic arrays provides a three-dimensional systolic-matrix architecture for security device 102.

Figure 6:
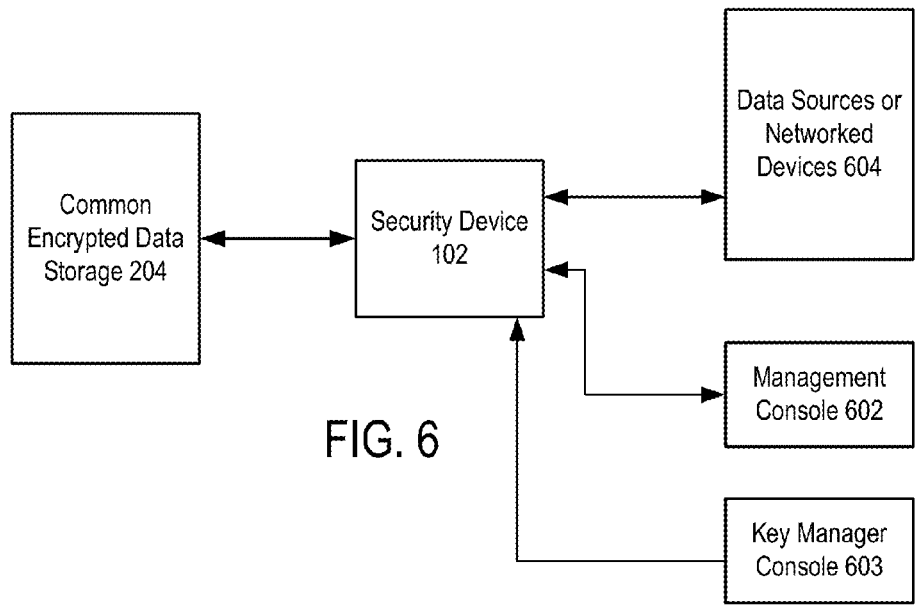
FIG. 6 shows a security device implemented between a data source and encrypted data storage using an in-line configuration, according to one embodiment.

FIG. 6 shows security device 102 implemented between a data source 604 and encrypted data storage 204 using an in-line configuration, according to one embodiment. In one example, security device 102 is installed as an enterprise high-performance data storage encryption and authentication appliance. The security device is installed as in-line (bump in the wire) between the data storage arrays. Security device 102 also interfaces with management console 602 and external key manager console 603.

Figure 7:
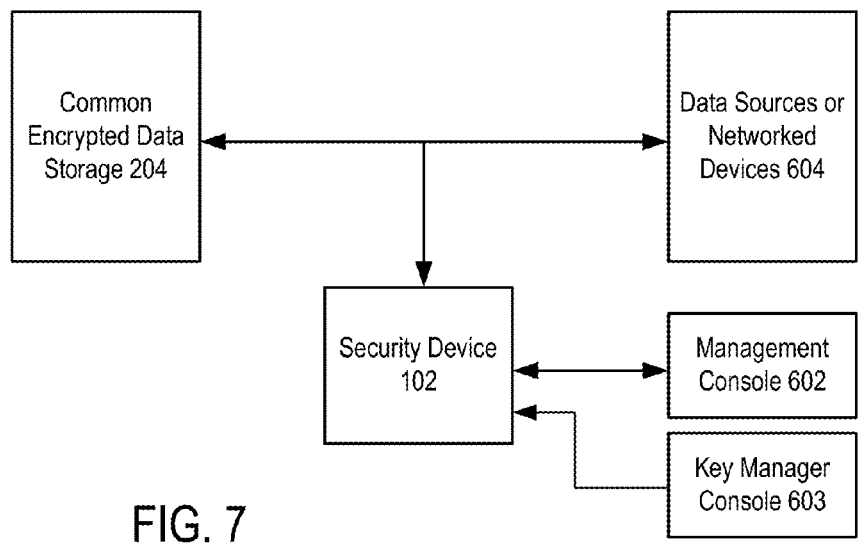
FIG. 7 shows a security device implemented between a data source and encrypted data storage using a side-car configuration, according to one embodiment.

FIG. 7 shows security device 102 implemented between data source 604 and encrypted data storage 204 using a side-car configuration, according to one embodiment. In one example, security device 102 is installed as a data storage encryption and authentication appliance as side car (off to the side of the data storage). Security device 102 also interfaces with management console 602 and external key manager console 603.

Figure 8:
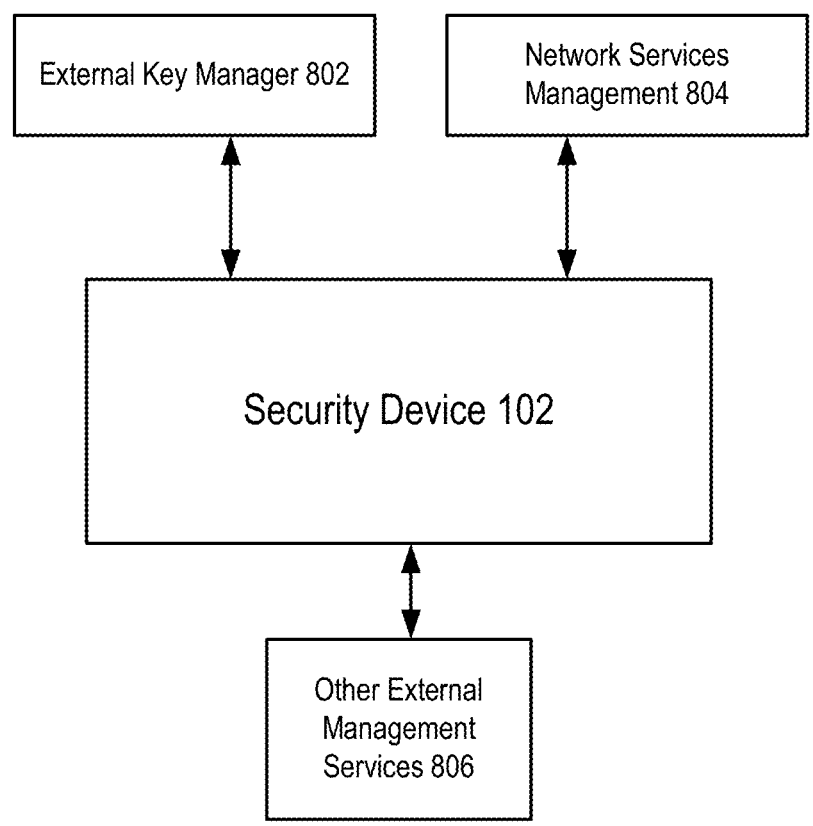
FIG. 8 shows a security device interfacing with external and network services, according to one embodiment.

FIG. 8 shows security device 102 interfacing with external and network services, according to one embodiment. In particular, security device 102 is interfaced with a management console consisting of external key manager 802, network services management 804, and any other required external management services 806.

Figure 9:
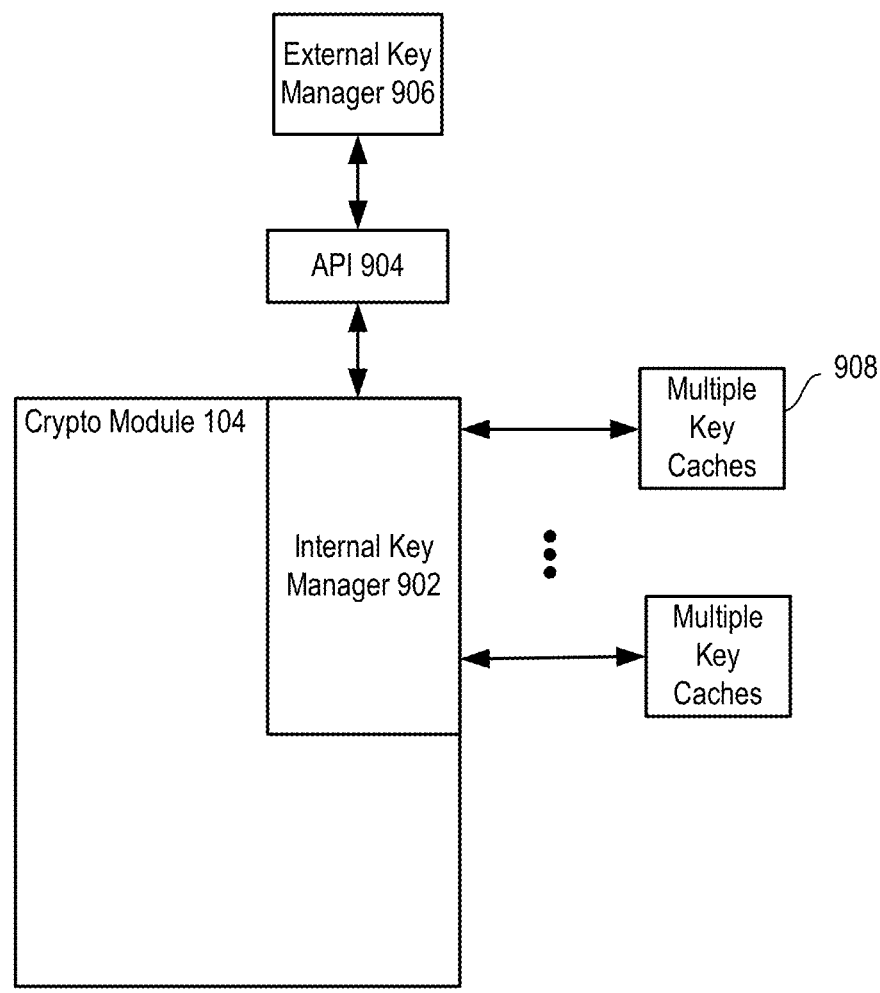
FIG. 9 shows an internal key manager of the cryptographic module that communicates with an external key manager via an application programming interface, according to one embodiment.

FIG. 9 shows an internal key manager 902 of cryptographic module 104 that communicates with an external key manager 906, according to one embodiment. Each of the plurality of cryptographic modules 104 comprises internal key manager 902, which is coupled via an application programming interface (API) 904 to external key manager 906. Keys received via API 904 are stored in one of multiple key caches 908 for use by the cryptographic modules 104 during encryption or decryption of incoming packets. In one embodiment, control plane processor 210 controls loading of the keys from API 904 to one of key caches 908.

In one embodiment, each of the incoming packets to a cryptographic module 104 includes a key tag to identify at least one key associated with the packet to be security processed, and further may also include a source tag to identify a data source and keys for the packet. The internal key manager 902 is configured to retrieve the keys from one of key caches 908 using the key tag for the packet to be processed by the respective cryptographic module 104.

In one embodiment, programmable input/output interface 106, 206, and/or 208 is further configured to route a packet to one of the plurality of cryptographic modules 104 based on the source tag.

In one embodiment, each of the plurality of cryptographic modules 104 may be physically partitioned from the other of the cryptographic modules. In one embodiment, other key features of security device 102 may include the ability to interface or port third party key management software and network management software.

Various additional, non-limiting embodiments of security device 102 are now described below. In one or more embodiments, security device 102 may provide one or more of the following advantages:

1. A fast data rate encryptor at hundreds of gigabits full duplex (e.g., for meeting future optical network data rates).

2. A programmable systolic architecture consisting of FPGAs and CPUs. The security device is flexible and programmable requiring only software upgrades for different versions and features.

3. Multi-tenancy to secure individual user's data. Each user's data will be encrypted/decrypted using a unique key per the user. In this way, each user's data will be uniquely encrypted/decrypted and stored in a common data storage area. If by operator or machine error the wrong data is accessed and mistakenly sent to another user, the data is still safe since it is not decrypted by the correct user key.

4. A multi-level security architecture to secure different levels of classified data using a single encryptor. Each classification of data will be encrypted/decrypted using a unique key per the data class. In this way, each classification of data will be uniquely encrypted/decrypted and stored in a common storage area. If by operator or machine error the wrong data is accessed and mistakenly sent to another level of classification, the data is still safe since it is not decrypted by the correct user key. Various embodiments for a multi-level security architecture are discussed below in the section titled "Multi-Level Independent Security System".

5. A high-speed key agility, key tagging-identification, key association and storage for millions of keys.

6. A flexible high-density I/O to interface to network equipment at multiple customer (or other source) sites. Also, the flexible I/O can be programmed for mixed interface types (e.g., 10 Gbs Ethernet, Infiniband, or PCI-express), thus requiring no interface bridging network equipment.

7. A replaceable, flexible I/O physical panel that can be customized for a specific network installation without the need to re-design the main chassis of security device 102.

8. A secure boot to protect, authenticate the CPUs, FPGAs firmware and software (SW) codes.

Figure 10:
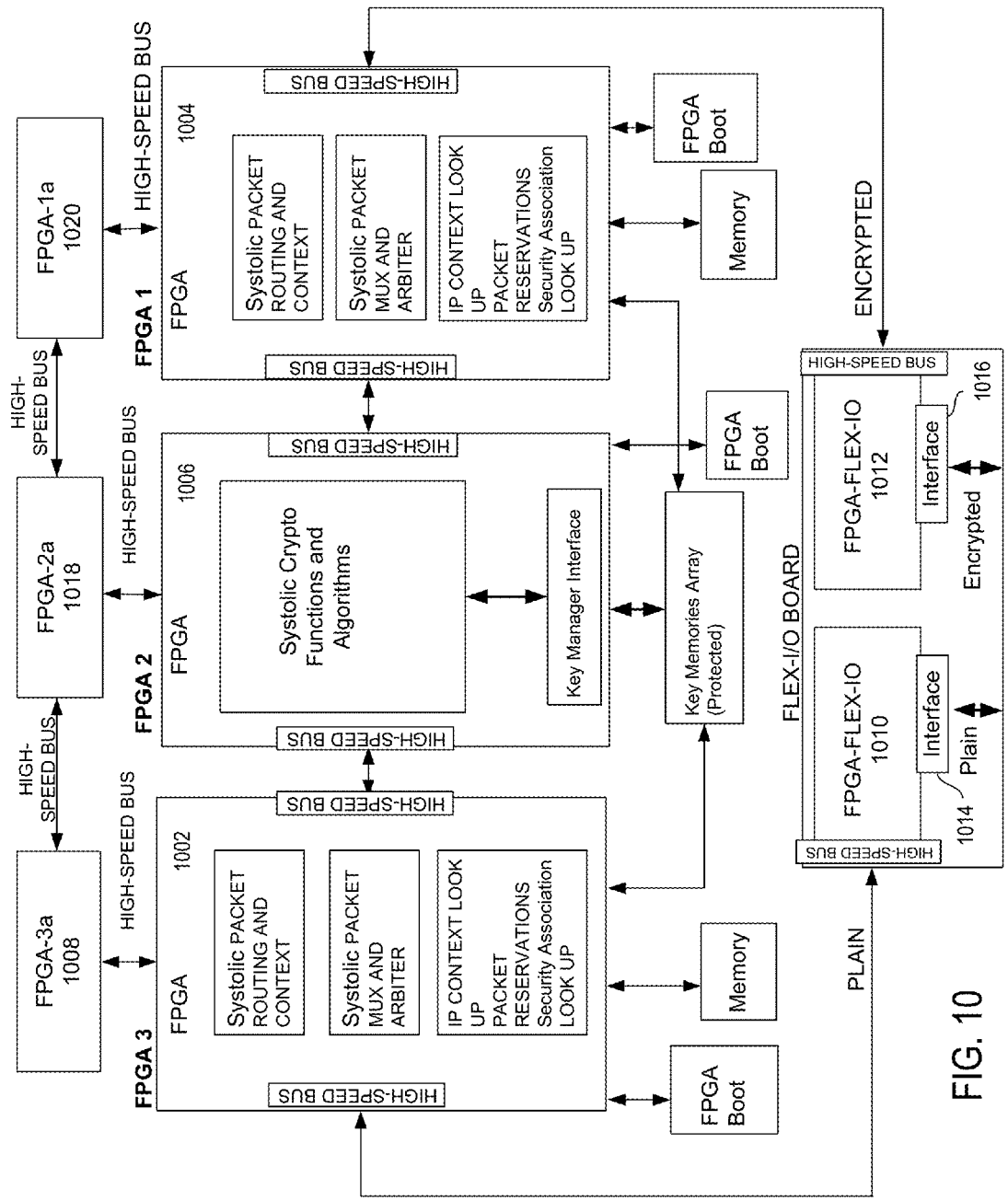
FIG. 10 shows a specific implementation of a programmable cryptographic module configured as a systolic array of FPGAs, according to one embodiment.

FIG. 10 shows a specific implementation of a programmable cryptographic module configured as a systolic-matrix array of FPGAs, according to one embodiment. In particular, the system of FIG. 10 is an exemplary implementation of cryptographic module 104 as was discussed for FIG. 3 above.

Specifically, un-encrypted or plain text data (e.g., incoming data packets) enters physical interface 1014 and is routed by programmable input interface 1010 to packet input engine 1002. Data packets are routed by input engine 1002 to an appropriate cryptographic core in cryptographic processing engine 1006.

A security association (SA) key lookup is used in packet engine 1002 or 1004 to determine appropriate keys for loading from a key memories array to cryptographic engine 1006 via a key manager interface or as defined in the packet header. These keys are used for security processing of the corresponding data packet.

After encryption by processing engine 1006, encrypted packets are provided to packet output engine 1004 for routing to programmable output interface 1012. The encrypted data leaves via physical interface 1016.

Programmable interfaces 1010 and 1012 may be formed using FPGAs or other programmable devices (e.g., as described above for I/O interfaces 106 or 208 of FIGS. 1 and 2). In one embodiment, physical interfaces 1014 and 1016 may form a part of interchangeable physical input/output interface 108. In one embodiment, physical interface 108 is implemented as a removable physical card.

In one embodiment, FPGAs 1008, 1018, and 1020 form a portion of the systolic-matrix array configuration illustrated in FIG. 10 and may be coupled to the packet input and output engines and cryptographic processing engine using serial buses. The packet input and output engines and cryptographic engine are formed using FPGAs to provide a two-dimensional systolic array of a top systolic layer. In one example, data and control processing is performed in two dimensions using the six FPGA units (e.g., FPGA 1008 and packet input engine 1002) as illustrated in FIG. 10.

In one embodiment, the sub-blocks in the packet input engine 1002 or packet output engine 1004 such as packet routing, packet multiplexer, and IP context lookup are implemented in a systolic-matrix array configuration as was discussed above. Data comes into the packet engine, and the packet engine looks at the packets, including the context, and decides where to route each packet. Then, the packet engine determines that a packet requires a particular security association, which is implemented using a key lookup. The packet engine associates the key to the incoming data. The key is read out, and the data is encrypted or decrypted in one of the crypto cores.

In one embodiment, high-speed memory is coupled to the input and output packet engines, and may be any type of high-speed memory in various embodiments.

In one embodiment, all primary processing works in a matrix. Data is constantly flowing in two dimensions. For example, data is flowing horizontally, keys are flowing up vertically, and control information is flowing down vertically as part of the two-dimensional processing.

Variations

Additional variations, details, and examples for various non-limiting embodiments are now discussed below. In a first variation, with reference to FIG. 1, the programmable input/output interface 106 is a router/switch that selects one of the crypto modules 104 to receive forwarded packets. A router and switch are incorporated inside the input/output interface 106. For example, if a first packet comes through a second port, the first packet will be routed to crypto module number six. Crypto module number six will later route the first packet back out through that same second port of original entry.

There may be two components to the programmable I/O interface. On one side, the interface programs the type of I/O that is desired. The other side of the interface is the router/switch. The router/switch multiplexer knows which crypto module 104 is to receive a given packet. Also, the router/switch knows which crypto module is ready for processing of a packet. For example, if crypto module number one is ready for processing, it will flag itself as being ready for processing. For example, there is a semaphore flag or packet header bits used that tells I/O interface 106 which module is ready to process data. Whatever port is used to bring in the data, that data will be processed in one of the crypto modules, and then tagged out back to the same port when later being decrypted and sent out from storage (e.g., the packet is tagged with some identification of the port using a tag). The tag is used to redirect the packet back to the correct port of original entry.

The crypto module has a security association that determines which keys go with which packet. The programmable input/output may allow programming of different applications because of the use of FPGAs. The back end of the router/switch will accommodate the type of input/output to be used. The router/switch will identify the crypto module to be used. When reprogramming the programmable interface 106, a new physical interface needs to be interchanged or installed. The main security device chassis is not changed out—only the I/O portion is being changed.

In one embodiment, remote ports 112 are basically control ports. The protocol for the remote port may typically be a Simple Network Management Protocol (SNMP) protocol or any other management protocols. The key fill port is where the keys are filled into the security device. The crypto ignition key ignites the security device.

With reference to FIG. 2, the Interbus serial bus (mentioned above) coordinates the operation of the two input/output interfaces 206, 218. The Interbus handles any protocol issues between the router and the switch functions of these interfaces. The Interbus is used to provide communication between the FPGAs of the systolic array during operation of the security device. In one example, the Interbus helps to coordinate operation as to which crypto module 104 will receive an incoming packet.

Processor 210 manages control plane operation. Processor 210 also configures components when a new security protocol will be used, uses routing tables, sets the configuration, sets up the programmability, and sets up the power-on self-test. Processor 210 also may facilitate key loading. The key fill port on the front of user panel 116 operates under control by processor 210.

With reference to FIG. 3, a secure boot is used to guarantee that the data booted into the FPGAs of the cryptographic module 104 is proper. The secure boot is executed when the unit is turned on or at boot-up. The code is authenticated by the system. The FPGAs are programmed at every boot up of the unit, or any time that the unit is reset. Each crypto module may have its own CPU which controls programming.

With reference to FIG. 8, external key management 802 is a location that the keys may be stored for passing to the security device 102. A network operator loads the keys into the external key management 802. The security device 102 loads the keys into the crypto modules. There is key tagging in the packet headers and inside the crypto module. When a packet comes into the security device 102, the packet is associated with a given key, and the packet contains information used to route the packet. The external key management can load keys in real-time or only a single time. Network services management 804 is remote management which provides control status, setting-up of the security device unit, and sending of the status back to a user. The other external management services 806 could be used to track how many other units are in the field, what the units are doing, whether each unit is running, and what configuration the unit is in.

In one embodiment, data packets include key tags, customer tags, and packet tags. The packet tag tells what type of packet is coming in. The customer tag identifies the company or source of the data. The key tag tells what key goes with what packet. Each tag is looked at by the packet engine to determine how the packet is going to be routed within the crypto module 104.

Now discussing an embodiment regarding flexible physical partitioning, each cryptographic module 104 may be physically isolated by design. So, only a certain packet will go through a module number one and only certain other packets will go through module number two. For example, crypto module number one may only process a certain style of packet. Crypto module number two may only process packets for a particular customer. Thus, it is physically partitioned. For example, customer number one's data is tagged as belonging to customer number one, for sending it to the specific crypto module. The router determines this requirement, and only that particular crypto module can process that customer's packet.

Regarding internal key management in the crypto module's performance, the key manager loads the keys, and further decides how the keys are dispersed within the crypto module based on the tagging of the incoming data packet. Keys are stored in the selectable key cache 908. The key manager decides based on the tagging of the data packet what keys will be associated with the current packet. This provides key agility.

With reference to FIG. 9, API 904 may be programmed to map into any of several different external key managers 906. The use of API 904 thus provides increased flexibility.

Multi-Level Independent Security System

Figure 11:
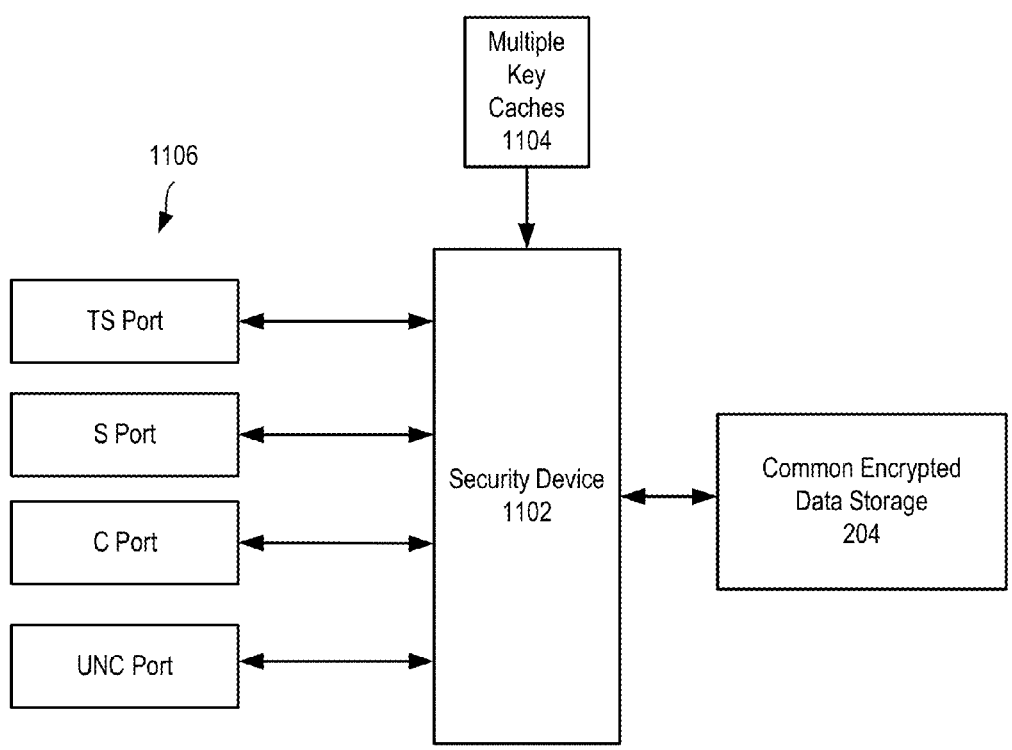
FIG. 11 shows a multi-level independent security system, according to one embodiment.

FIG. 11 shows a multi-level independent security system, according to one embodiment. This system uses four input/output ports 1106 (I/Os) for each of several classified levels such as, e.g., top secret (TS), secret (S), confidential (C) and unclassified (UNC). It should be noted that in other embodiments the number of levels may be lesser or greater.

Ports 1106 are coupled to a security device 1102, which includes multiple key caches 1104. Security device 1102 receives data from one of ports 1106, encrypts the data, and sends the data for storage in a common encrypted data storage 204 (storage 204 may be, for example, a storage area or a network). In one embodiment, security device 1102 may be implemented based on security device 102 as was discussed above for FIGS. 1-10.

In one embodiment, the security system includes a plurality of data input ports 1106, each port corresponding to one of a plurality of different levels of security classification (e.g., top-secret or secret). Security device 1102 is configured for cryptographic processing including encryption and decryption of incoming data received from one of the plurality of input ports 1106. The incoming data includes first data having one of several predefined classification levels.

Security device 1102 includes a key manager (not shown). The key manager may be implemented as was discussed, for example, above for internal key manager 902 of FIG. 9, or as discussed below with respect to the key store controller of FIG. 13. The key manager is configured to select a set of keys from a plurality of key sets, each of the key sets corresponding to one of the different levels of security classification. This set of keys is used by the security device to encrypt the first data. Common encrypted data storage 204 receives the encrypted first data from the security device for storage.

In one embodiment, security device 1102 comprises a cryptographic module (not shown), and the key manager is an internal key manager of the cryptographic module. In one embodiment, the system comprises a plurality of key caches 1104, wherein the key manager is coupled to an external key manager (e.g., external key manager 906 of FIG. 9 as was discussed above). The keys received from the external key manager are stored in one of the key caches for use by security device 1102 during encryption of incoming data packets.

In one embodiment, security device 1102 comprises a plurality of cryptographic modules (discussed below), and each cryptographic module is dedicated to perform security processing for only one of the different levels of security classification. In one embodiment, the system further comprises key caches 1104. In one embodiment, each of the cryptographic modules is physically isolated from the other of the cryptographic modules.

In one embodiment, the first data is a first data packet comprising a tag that identifies one of the levels of security classification. The system further comprises an interface (not shown) between the input ports and the cryptographic modules. The interface routes the first data packet to one of the cryptographic modules based on the tag.

In one embodiment, the interface between the input ports and the cryptographic modules is a programmable input/output interface (e.g., as was discussed above with respect to FIG. 1). The programmable input/output interface may be programmable to support different interface protocols, and each of the plurality of cryptographic modules may be programmable to support different encryption protocols. The programmable input/output interface may include one or more field-programmable gate arrays that are each programmable to support the different interface protocols.

In one embodiment, a multi-level secure storage encryption system is used (e.g., for military or government-centric intelligence systems) to encrypt and store different classified data using a single secure, trusted encryptor (e.g., security device 1102) and store the encrypted data in a common storage array or area (e.g., common encrypted data storage 204).

In one embodiment, a multi-level secure storage encryption system uses a single encryption method where the encrypted data is consolidated and stored in a common data storage array or site (e.g., common encrypted data storage 204). This avoids having to implement different, physically-separated storage systems as used in prior approaches.

In one embodiment, a multi-level security architecture to secure different levels of classified data uses a single encryptor. Each classification of data is encrypted/decrypted using a unique key for each data class (e.g., top secret or secret). In this way, each classification of data is uniquely encrypted/decrypted and stored in a common data storage area. If by operator or machine error the wrong data is accessed and mistakenly sent to another level of classification, the data is still safe since it cannot be decrypted by the proper user key.

Figure 12:
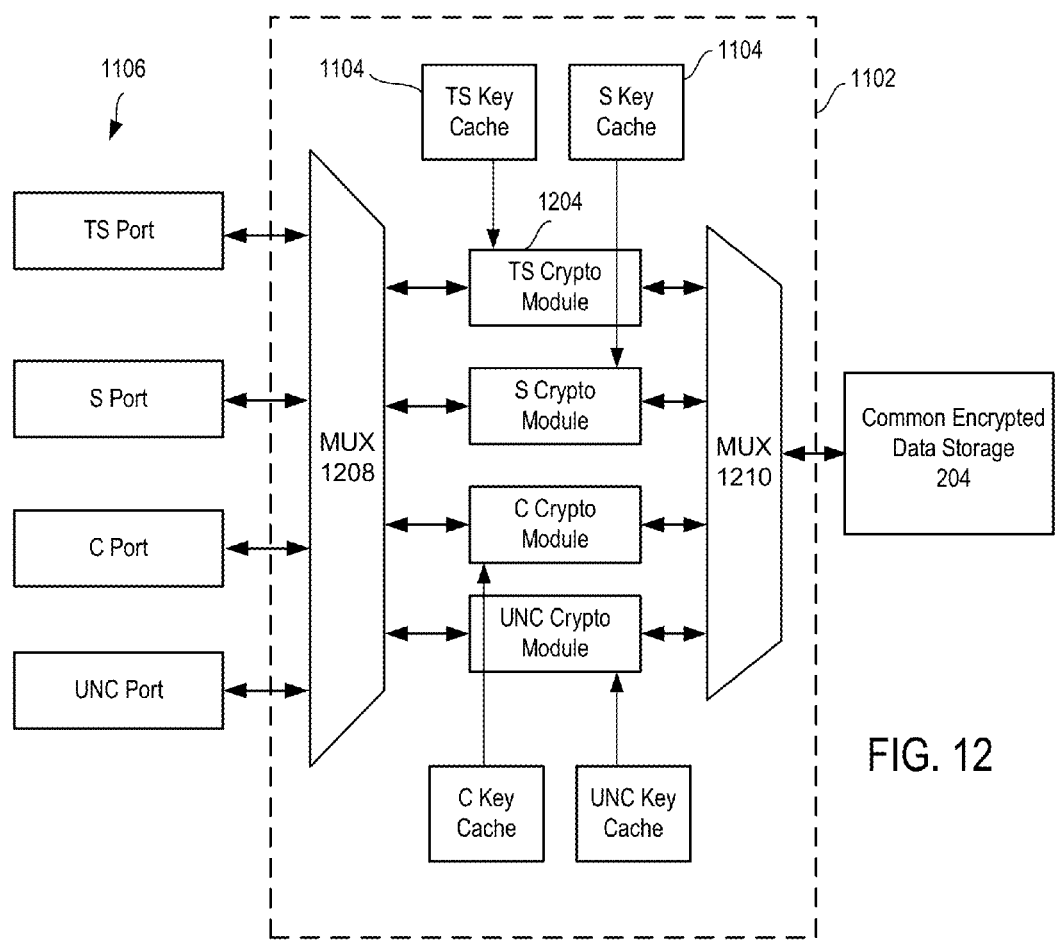
FIG. 12 shows a security device as implemented in the security system of FIG. 11, according to one embodiment.

FIG. 12 shows security device 1102 as implemented in the security system of FIG. 11, according to one embodiment. Incoming data ports 1106 are coupled to a multiplexer 1208, which routes incoming data packets to the appropriate one of cryptographic modules 1204 (e.g., based on information associated with the data packet such as in a header of the packet).

In one embodiment, each of the cryptographic modules 1204 comprises a packet input engine (not shown in FIG. 12) and a cryptographic engine (not shown in FIG. 12), each configured for data processing as part of a two-dimensional systolic array (e.g., as was discussed above with respect to FIGS. 3-5).

An appropriate set of keys is selected (e.g., by using a key store controller, as discussed below in FIG. 13) from one of key caches 1104. For example, keys corresponding to a top secret (TS) level of classification are selected from the TS key cache for processing data packets in TS cryptographic module 1204 that are received from TS port 1106. After encryption, the TS data packets are routed by multiplexer 1210 to common encrypted data storage 204.

In one embodiment, a security processing method includes receiving incoming data from data ports 1106, wherein the incoming data includes first data having a first classification level; encrypting the first data using a first set of keys selected from a plurality of key sets (e.g., key selected from TS key cache 1104); and writing the encrypted first data into common encrypted data storage 204. In one embodiment, the first data is encrypted using cryptographic module 1204, and the method further comprises zeroizing the cryptographic module after the encrypting of the first data.

In one embodiment, the first data is a first data packet, and the method further comprises adding a benign tag (or an alternative form of tag) to a header of the first data packet to indicate a classification level at which the first data packet is being stored.

In one embodiment, the method further comprises reading the first data packet from the common encrypted data storage 204; verifying the classification level of the first data packet using the tag; and addressing a key store controller to select a key associated with the first data packet to use in decrypting the first data packet; loading the selected key into a cryptographic core (e.g., a cryptographic core located in TS cryptographic module 1204); and decrypting the first data packet using the cryptographic core.

In one embodiment, the method further comprises selecting, by the key store controller, one of the data ports 1106; and routing the decrypted first data packet to the data port selected by the key store controller.

In one embodiment, the method further comprises routing the first data packet from the common encrypted data storage 204 using a fail safe multiplexer (e.g. multiplexer 1210); sending the first data packet to the cryptographic core for decryption; and zeroizing the fail safe multiplexer and the cryptographic core after each classified level of data is processed.

In one embodiment, the method further comprises reading the first data packet from a common un-encrypted data network (e.g., as received over one of incoming data ports 1106); verifying the first classification level of the first data packet using the benign tag; addressing a key store controller to select a key associated with the first data packet to use in encrypting the first data packet; loading the selected key into a cryptographic core; and encrypting the first data packet using the cryptographic core.

In one embodiment, the method further comprises routing the first data packet from the common un-encrypted data network using a fail safe multiplexer; sending the first data packet to the cryptographic core for encryption; and zeroizing the fail safe multiplexer and the cryptographic core after each classified level of data is processed.

Figure 13:
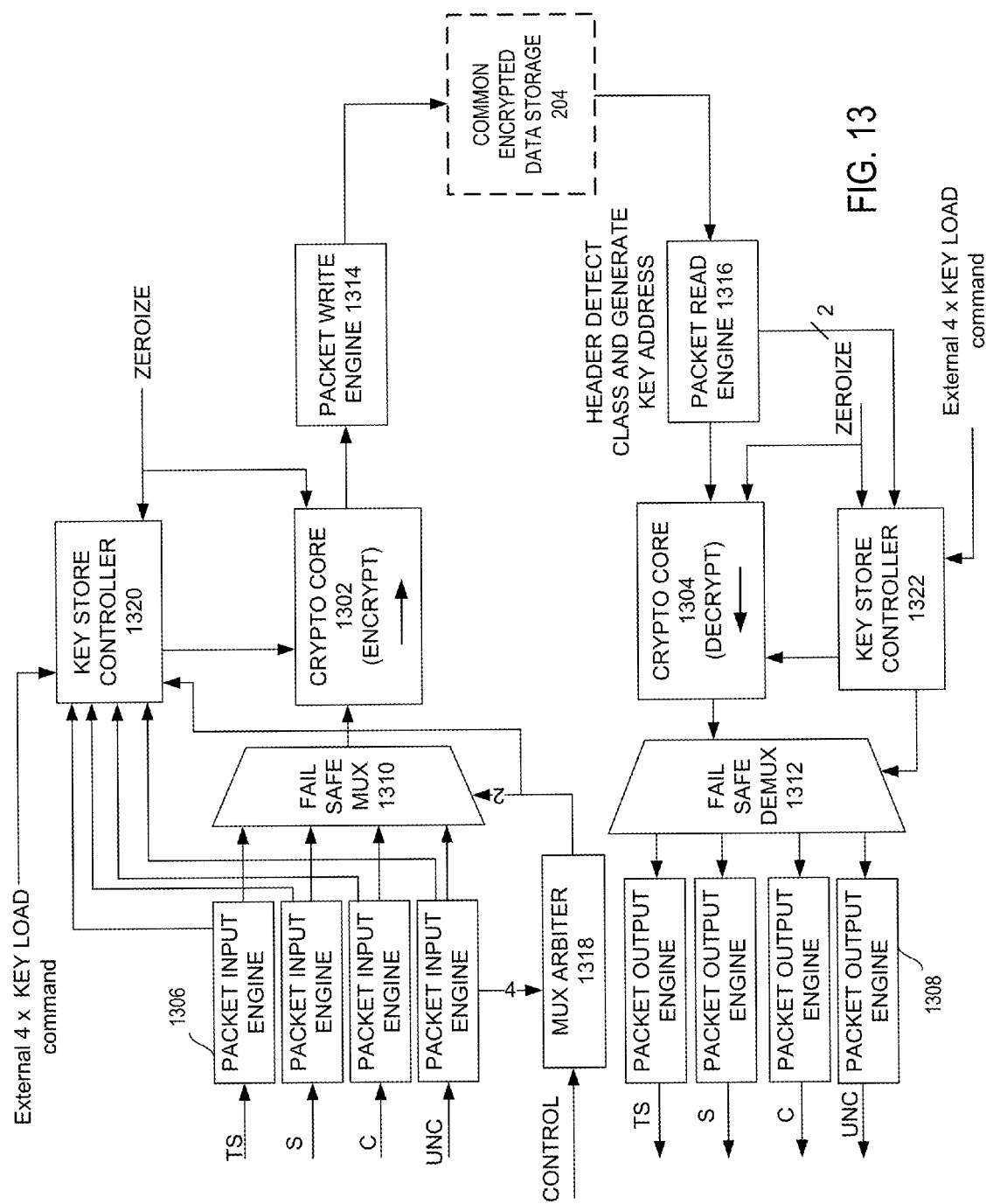
FIG. 13 is block diagram of a cryptographic module as used in the security device of FIG. 12, according to one embodiment.

FIG. 13 is block diagram of a cryptographic module 1204 as used in the security device 1102 of FIG. 12, according to one embodiment. The cryptographic module is dedicated to perform encryption and decryption for one of the different levels of security classification. The cryptographic module is coupled to receive incoming data from one of the plurality of data ports 1106 discussed above, and the incoming data includes first data having a first classification level. Incoming data from one of packet input engines 1306 is routed by fail safe multiplexer 1310 to cryptographic core 1302 for encryption.

Key store controller 1320 selects a first set of keys from the plurality of key sets (as discussed above) to encrypt the first data by the cryptographic module. A packet write engine 1314 sends the encrypted first data to common data storage 204. In one embodiment, the first data includes a tag identifying the first classification level, and the first data has been routed to the cryptographic module based on the tag.

In one embodiment, the cryptographic module further includes a key store controller 1322 to select, based on a control signal, a second set of keys from the plurality of key sets to use in decrypting the first data (e.g., these keys may be selected from the appropriate one of key caches 1104); and a packet read engine 1316 that reads the encrypted first data from the common data storage 204. Packet read engine 1316 provides the control signal to the key store controller 1322. The encrypted first data is decrypted by cryptographic core 1304. The decrypted data is routed by fail safe demultiplexer 1312 to one of several packet output engines 1308. Each packet output engine 1308 corresponds to one of the levels of security classification.

In one embodiment, the cryptographic module includes a programmable systolic packet input engine, a programmable systolic cryptographic engine (e.g., cryptographic cores 1302 and 1304 are implemented using a systolic architecture as was discussed above), and a programmable systolic packet output engine.

In one embodiment, a multi-level secure architecture has four I/Os for each classified level: top secret (TS), secret (S), confidential (C) and unclassified (UNC). Each classified input uses packet input engine 1306 to process, detect, or modify packet headers of the incoming data packets and to insert header bits to denote and authenticate the classified data prior to sending to fail safe multiplexer (MUX) 1310.

In one embodiment, the fail safe MUX 1310 is configured to ensure that the data from different classified levels will not mix with other data from a different classified level. If there is a failure in the MUX, the MUX will fail safe in a safe state. The MUX will also zeroize itself after each classified level of data is processed. This leaves no data from the last processing in the MUX (i.e., the data is erased).

In one embodiment, a MUX arbiter 1318 addresses the fail safe MUX 1310. The MUX arbiter 1318 is controlled by the respective level's packet input engine 1306. Based on inputs from the packet input engines 1306, the MUX arbiter 1318 decides what packet is processed by the fail safe MUX.

In one embodiment, each respective packet input engine 1306 also addresses a write key store controller 1320. The write key store controller 1320 may be configured with a fail safe design to address each separate classified key storage memory and send the selected key to cryptographic core ("crypto core") 1302.

In one embodiment, in a write cycle the crypto core 1302 encrypts the data with the selected key per the classified data. The encrypted output of the crypto core 1302 is sent to the packet write engine 1314. The packet write engine will add a benign data tag to the header indicating the level at which data is being stored. In one embodiment, the benign tag is a generic and will not indicate the actual level of classified encrypted data being stored. In other embodiments, the benign tag may indicate the level of classified data. After the encryption cycle, the data that was processed is zeroized (i.e., erased).

In one embodiment, in a read cycle encrypted data from common encrypted data storage 204 is loaded into packet read engine 1316, which authenticates the data and verifies the benign generic tag as to the level of storage of the classified data. The packet read engine 1316 then addresses the read key store controller 1322 for the associated key. The selected key is loaded into crypto core 1304, and the data from the packet read engine 1316 is decrypted. After this decryption cycle, the data that was processed is zeroized (i.e., the data is erased).

In one embodiment, the read key store controller 1322 addresses and selects an output port where the decrypted data is sent for an output of fail safe demultiplexer (DE-MUX) 1312. If there is a failure in the DEMUX, the DEMUX will fail safe to a safe state. The DEMUX will also zeroize itself after each classified level of data is processed. Thus, this leaves no data from the last processing in the DEMUX. The output of the DEMUX is active per the selected output port. Each output of the DEMUX is physically isolated per the classified data path.

Additional variations, details, and examples for various non-limiting embodiments of the multi-level security system are now discussed below. In a first variation, data paths in the security system are physically isolated. A packet is tagged with a customer identification and the packet will only go through one cryptographic module, which corresponds to the appropriate level of data classification. The cryptographic modules are physically partitioned. In an alternative embodiment, data for each of the different classification levels is processed in a single, common cryptographic module, which is zeroized after processing each level of classification. In one variation, the fail safe multiplexer 1310 may be a switch such as used inside high-speed input/output interfaces 206 and 208 of FIG. 2 discussed above.

In one example, when using only one cryptographic module, the selection of the appropriate keys for a classification level is how data partitioning is accomplished. For example, for top secret data, only a top secret key can be used to encrypt or decrypt the top-secret data. Afterwards, the cryptographic module is zeroized. Then, confidential data may be processed by the cryptographic module using a key for confidential data. There is a tag on the packet that identifies the level of classification. So, an incoming top secret packet will line up with a top secret key and a top secret algorithm.

In another variation, encrypted top secret data is read from common data storage 204. After decrypting the packet using the appropriate level of key, the packet is routed to the top secret port. The packet output engines 1308 are physically isolated. The zeroize command zeroizes the cryptographic core and the key store controller after processing the top secret data (this zeroizing is done before loading a new set of keys). In this variation, the cryptographic engine is zeroized after operation at each level of classification because the cryptographic engine is being shared with multiple classification levels.

Closing

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a plurality of data input ports, each port corresponding to one of a plurality of different levels of security classification;
   a security device, configured for cryptographic processing, coupled to receive incoming data from each of the plurality of input ports, wherein the incoming data includes a first data packet having a first classification level, the first data packet comprises a tag that identifies one of the levels of security classification, and the security device comprises a plurality of cryptographic modules, each cryptographic module dedicated to perform security processing for only one of the different levels of security classification, and each cryptographic module comprising at least one processor configured to perform the security processing;
   a multiplexer configured to route the first data packet from one of the data input ports to one of the cryptographic modules based on the tag, the multiplexer comprising at least one field-programmable gate array programmable to support different interface protocols;
   at least one memory to store a plurality of key sets;
   a key manager configured to select, via the at least one memory, a first set of keys from the plurality of key sets, each of the key sets corresponding to one of the different levels of security classification, wherein the first set of keys is used by the security device to encrypt the first data packet; and
   a common encrypted data storage, coupled to receive the encrypted first data packet from the security device for storage.

2. The system of claim 1, wherein the key manager is an internal key manager of one of the cryptographic modules.

3. The system of claim 1, further comprising a plurality of key caches of the at least one memory, wherein the key manager is coupled to an external key manager, and keys received from the external key manager are tagged-identified and stored in one of the associated key caches for use by the security device during encryption of incoming data packets.

4. The system of claim 1, further comprising a plurality of key caches of the at least one memory, wherein keys are stored in each of the key caches for use by a selected one of the cryptographic modules during encryption of incoming data packets.

5. The system of claim 1, wherein each of the plurality of cryptographic modules is programmable to support different encryption protocols.

6. The system of claim 1, wherein each of the cryptographic modules is physically isolated from the other of the cryptographic modules.

7. The system of claim 1, wherein each of the cryptographic modules comprises a packet input engine and a cryptographic engine, each configured for data processing as part of a two-dimensional systolic array.

8. A method, comprising:
   providing a plurality of cryptographic modules, each cryptographic module dedicated to perform security processing for only one of different levels of security classification, the cryptographic modules including a first cryptographic module comprising at least one processor configured to perform the security processing for a first classification level;
   receiving incoming data from a plurality of data ports, each port corresponding to one of the levels of security classification, wherein the incoming data includes a first data packet comprising a tag that identifies the first classification level;
   routing, by a multiplexer, the first data packet from one of the data ports to the first cryptographic module based on the tag;
   encrypting, by the first cryptographic module, the first data packet using a first set of keys, the first set of keys selected from a plurality of key sets stored in at least one memory, each of the key sets corresponding to one of the different levels of security classification; and
   writing the encrypted first data packet into a common encrypted data storage.

9. The method of claim 8, further comprising zeroizing the first cryptographic module after the encrypting of the first data packet.

10. The method of claim 8, wherein the tag is a tag in a header of the first data packet, the tag indicating that the first data packet is stored at the first classification level.

11. The method of claim 10, further comprising:
    reading the first data packet from the common encrypted data storage;
    verifying the classification level of the first data packet using the tag; and
    addressing a key store controller to select a key associated with the first data packet to use in decrypting the first data packet;
    loading the selected key into a cryptographic core; and
    decrypting the first data packet using the cryptographic core.

12. The method of claim 11, further comprising:
    selecting, by the key store controller, one of the data ports; and
    routing the decrypted first data packet to the data port selected by the key store controller.

13. The method of claim 11, further comprising:
    routing the first data packet from the common encrypted data storage using a fail safe multiplexer;
    sending the first data packet to the cryptographic core for decryption; and
    zeroizing the fail safe multiplexer and the cryptographic core after each classified level of data is processed.

14. The method of claim 10, further comprising:
    reading the first data packet from a common un-encrypted data network;
    verifying the first classification level of the first data packet using the tag;
    addressing a key store controller to select a key associated with the first data packet to use in encrypting the first data packet;
    loading the selected key into a cryptographic core; and
    encrypting the first data packet using the cryptographic core.

15. The method of claim 14, further comprising:
    routing the first data packet from the common un-encrypted data network using a fail safe multiplexer;
    sending the first data packet to the cryptographic core for encryption; and
    zeroizing the fail safe multiplexer and the cryptographic core after each classified level of data is processed.

16. A security device, comprising:
a plurality of data ports, each port corresponding to one of a plurality of different levels of security classification;
a plurality of cryptographic modules, each cryptographic module dedicated to perform encryption and decryption for only one of the different levels of security classification, each cryptographic module coupled to receive incoming data from one of the plurality of data ports, and the incoming data including a first data packet comprising a tag that identifies a first classification level, and each cryptographic module comprising at least one processor configured to perform the encryption and decryption;
a multiplexer configured to route the first data packet from one of the data ports to one of the cryptographic modules based on the tag;
at least one key cache storing, via at least one memory, a plurality of key sets, each of the key sets corresponding to one of the different levels of security classification, wherein a first set of keys is selected from the plurality of key sets to encrypt the first data packet by a first cryptographic module of the cryptographic modules; and
a packet write engine, included in the first cryptographic module, configured to send the encrypted first data packet to a common data storage.

17. The security device of claim 16, wherein each of the plurality of cryptographic modules comprises a programmable systolic packet input engine, a programmable systolic cryptographic engine, and a programmable systolic packet output engine.

18. The security device of claim 16, further comprising:
a controller configured to select, based on a signal, a second set of keys from the plurality of key sets to use in decrypting the first data packet; and
a packet read engine, coupled to provide the signal to the controller, configured to read the encrypted first data packet from the common data storage.

* * * * *

UNITED STATES PATENT AND TRADEMARK OFFICE
CERTIFICATE OF CORRECTION

| | |
|---|---|
| PATENT NO. | : 9,524,399 B1 |
| APPLICATION NO. | : 14/198097 |
| DATED | : December 20, 2016 |
| INVENTOR(S) | : Takahashi |

Page 1 of 1

It is certified that error appears in the above-identified patent and that said Letters Patent is hereby corrected as shown below:

In Fig. 10, Sheet 8 of 11, for Tag "1010", in Line 1, delete "FPGA-FLEX-IO" and insert -- FPGA-FLEX-I/O --, therefor.

In Fig. 10, Sheet 8 of 11, for Tag "1012", in Line 1, delete "FPGA-FLEX-IO" and insert -- FPGA-FLEX-I/O --, therefor.

In Column 5, Lines 38-39, delete "high-speed programmable" and insert -- high-speed --, therefor.

In Column 5, Line 45, delete "embodiment" and insert -- embodiment, --, therefor.

In Column 11, Line 4, delete "programmable interface" and insert -- programmable I/O interface --, therefor.

In Column 18, Line 31, in Claim 11, delete "tag; and" and insert -- tag; --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*